US010380486B2

(12) United States Patent
Krauss

(10) Patent No.: US 10,380,486 B2
(45) Date of Patent: Aug. 13, 2019

(54) CLASSIFYING ENTITIES BY BEHAVIOR

(71) Applicant: International Business Machines Corporation, Armonk, NY (US)

(72) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 14/600,699

(22) Filed: Jan. 20, 2015

(65) Prior Publication Data
US 2016/0210317 A1 Jul. 21, 2016

(51) Int. Cl.
G06N 5/02 (2006.01)

(52) U.S. Cl.
CPC .................. G06N 5/022 (2013.01)

(58) Field of Classification Search
CPC .......... G06N 5/00; G06N 5/022; G06N 20/00; G06F 17/3071; G06F 17/30598
USPC ......................................................... 707/737
See application file for complete search history.

(56) References Cited

U.S. PATENT DOCUMENTS

| 5,692,195 | A | * | 11/1997 | Conner | G06F 9/449 719/316 |
| 5,768,505 | A | * | 6/1998 | Gilchrist | G06Q 10/107 709/201 |
| 5,809,296 | A | * | 9/1998 | Yong | G06F 17/30595 |
| 6,055,540 | A | * | 4/2000 | Snow | G06F 17/3061 |
| 6,104,835 | A | * | 8/2000 | Han | G06K 9/6274 382/159 |
| 6,456,993 | B1 | * | 9/2002 | Freund | G06K 9/6282 706/46 |
| 6,678,413 | B1 | * | 1/2004 | Liang | A61B 5/1113 348/169 |
| 6,738,077 | B1 | * | 5/2004 | Wendker | G06F 17/3056 707/E17.005 |
| 7,043,492 | B1 | | 5/2006 | Neal et al. | |

(Continued)

FOREIGN PATENT DOCUMENTS

EP 0681249 B1 8/2002
WO WO-2014109781 A1 * 7/2014 ............. H04L 67/22

OTHER PUBLICATIONS

Nadeau et al., "A Survey of Named Entity Recognition and Classification", Linguisticae Investigationes, vol. 30, pp. 3-26, 2007.*

(Continued)

Primary Examiner — Phuong Thao Cao
(74) Attorney, Agent, or Firm — Mollborn Patents, Inc.; Fredrik Mollborn

(57) ABSTRACT

Methods and apparatus, including computer program products, implementing and using techniques for classifying entities. Data representing an observation of an entity is received. One or more features of the entity are identified. A first classification for the entity is assigned based on the identified features, and a best fit analysis of the identified features to existing classifications. In response to identifying one or more additional features of the entity and determining that the identified additional features meet an update criterion, or in response to determining that the identified features meet an update criterion based on a modified best fit analysis, the assigned first classification for the entity is changed to a second classification for the entity.

13 Claims, 4 Drawing Sheets

(56) References Cited

U.S. PATENT DOCUMENTS

| | | | |
|---|---|---|---|
| 7,107,254 B1* | 9/2006 | Dumais | G06N 7/005 706/12 |
| 7,263,515 B1* | 8/2007 | Tenorio | G06Q 30/02 |
| 7,337,186 B2 | 2/2008 | Inokuchi et al. | |
| 7,376,672 B2* | 5/2008 | Weare | G06F 17/30598 707/753 |
| 7,447,334 B1* | 11/2008 | Jiang | G06K 9/00362 348/143 |
| 7,539,936 B2* | 5/2009 | Bender | G06F 17/2247 715/200 |
| 7,558,766 B1* | 7/2009 | Forman | G06K 9/6256 706/20 |
| 7,613,687 B2* | 11/2009 | Nye | G06F 17/30705 |
| 7,756,874 B2* | 7/2010 | Hoekman | G06F 17/30038 707/737 |
| 7,840,551 B2* | 11/2010 | Wong | G06F 21/6227 707/713 |
| 7,970,766 B1* | 6/2011 | Shamsi | G06F 16/288 707/737 |
| 8,095,481 B2* | 1/2012 | Ocke | G06Q 10/00 706/12 |
| 8,103,628 B2* | 1/2012 | Howe | G06F 17/30212 707/626 |
| 8,214,363 B2* | 7/2012 | Chaudhary | G06F 16/951 707/736 |
| 8,290,968 B2* | 10/2012 | Jonas | G06F 17/30598 707/756 |
| 8,375,020 B1* | 2/2013 | Rogers | G06F 17/30038 707/708 |
| 8,380,583 B1* | 2/2013 | Chanda | G06Q 30/0255 705/26.64 |
| 8,380,696 B1* | 2/2013 | Rogers | G06F 17/30038 707/708 |
| 8,572,086 B2* | 10/2013 | Soderberg | G06F 17/3028 382/180 |
| 8,589,399 B1* | 11/2013 | Lee | G06F 17/30616 707/737 |
| 8,594,996 B2* | 11/2013 | Liang | G06F 17/21 704/9 |
| 8,676,804 B1* | 3/2014 | Janos | G06F 16/285 707/737 |
| 8,706,732 B1* | 4/2014 | Janos | G06F 16/9537 707/737 |
| 8,885,229 B1* | 11/2014 | Amtrup | H04N 1/00251 358/473 |
| 8,924,389 B2* | 12/2014 | Elliot | G06Q 50/26 707/737 |
| 8,990,211 B1* | 3/2015 | Janos | G06F 16/285 707/737 |
| 9,116,982 B1* | 8/2015 | Stern | G06F 17/30707 707/737 |
| 9,270,451 B2* | 2/2016 | Jonas | G06F 21/6209 |
| 9,372,897 B2* | 6/2016 | Krauss | G06F 16/288 |
| 9,412,069 B1* | 8/2016 | Hilley | G06N 5/022 |
| 9,594,791 B2* | 3/2017 | Bell | G06F 16/21 |
| 2002/0128990 A1* | 9/2002 | Kaminskas | G06N 5/025 706/45 |
| 2002/0186882 A1* | 12/2002 | Cotman | G06K 9/00127 382/165 |
| 2003/0212675 A1* | 11/2003 | Denesuk | G06F 16/951 |
| 2004/0017929 A1* | 1/2004 | Bramblet | G07C 9/00 382/103 |
| 2004/0019609 A1* | 1/2004 | Orton, III | G06Q 10/10 |
| 2004/0044597 A1* | 3/2004 | McLachlan | G06Q 10/087 705/28 |
| 2006/0101005 A1* | 5/2006 | Yang | G06F 17/3087 |
| 2006/0136259 A1* | 6/2006 | Weiner | G06F 19/322 705/2 |
| 2006/0136417 A1* | 6/2006 | Avinash | G06F 17/30017 |
| 2006/0136467 A1* | 6/2006 | Avinash | G06F 17/30557 |
| 2006/0187830 A1* | 8/2006 | Nam | H04L 47/6215 370/229 |
| 2007/0038437 A1* | 2/2007 | Brun | G06F 17/278 704/9 |
| 2007/0058836 A1* | 3/2007 | Boregowda | G06K 9/00771 382/103 |
| 2007/0078873 A1* | 4/2007 | Avinash | G06F 17/3028 |
| 2007/0122040 A1* | 5/2007 | Au | G06K 9/00771 382/224 |
| 2007/0192715 A1* | 8/2007 | Kataria | G06Q 10/06 715/764 |
| 2007/0269804 A1* | 11/2007 | Liew | G06F 19/24 435/6.11 |
| 2007/0273696 A1* | 11/2007 | Cheng | G06K 9/00771 345/467 |
| 2007/0294252 A1* | 12/2007 | Fetterly | G06F 17/30864 |
| 2008/0162515 A1* | 7/2008 | Dovas | G06Q 10/063 |
| 2008/0201722 A1* | 8/2008 | Sarathy | G06F 21/6209 719/311 |
| 2008/0240580 A1* | 10/2008 | Sugano | G06K 9/00711 382/224 |
| 2009/0138505 A1* | 5/2009 | Purdy | G06F 17/30743 |
| 2009/0164416 A1* | 6/2009 | Guha | G06F 17/30613 |
| 2009/0216703 A1* | 8/2009 | Shepherd | G06N 5/02 706/50 |
| 2010/0030781 A1* | 2/2010 | Wong | G06F 21/6227 707/783 |
| 2010/0131467 A1* | 5/2010 | Prahlad | G06F 16/24575 707/617 |
| 2010/0217755 A1 | 8/2010 | Vignoli | |
| 2010/0250537 A1 | 9/2010 | Van De Par | |
| 2010/0293195 A1* | 11/2010 | Houghton | G06F 17/241 707/776 |
| 2011/0059853 A1* | 3/2011 | Emler | G06F 19/28 506/8 |
| 2011/0122138 A1* | 5/2011 | Schmidt | G06K 9/6253 345/440 |
| 2011/0131244 A1* | 6/2011 | Padovitz | G06F 16/367 707/776 |
| 2011/0153528 A1* | 6/2011 | Bailey | G06Q 30/02 706/12 |
| 2011/0314482 A1* | 12/2011 | Cupala | G06F 17/30899 719/328 |
| 2011/0320455 A1* | 12/2011 | Jonas | G06F 17/30598 707/740 |
| 2012/0102031 A1* | 4/2012 | Shami | G06F 16/353 707/737 |
| 2012/0185480 A1* | 7/2012 | Ni | G06F 16/355 707/737 |
| 2012/0195459 A1* | 8/2012 | Schmidt | G06K 9/00335 382/103 |
| 2012/0330952 A1* | 12/2012 | Kong | G06F 16/951 707/737 |
| 2013/0036119 A1* | 2/2013 | Yakout | G06F 16/24558 707/737 |
| 2013/0054598 A1* | 2/2013 | Caceres | G06F 16/215 707/737 |
| 2013/0057249 A1* | 3/2013 | Winter | G01V 3/00 324/67 |
| 2013/0166485 A1* | 6/2013 | Hoffmann | G06N 99/005 706/20 |
| 2013/0182905 A1* | 7/2013 | Myers | H04N 7/18 382/103 |
| 2013/0208950 A1* | 8/2013 | Athelogou | G06T 7/0012 382/107 |
| 2013/0246321 A1* | 9/2013 | Pandit | G06Q 10/06 706/14 |
| 2013/0297604 A1* | 11/2013 | Sutedja | G06Q 10/107 707/737 |
| 2014/0006404 A1* | 1/2014 | McGrew | G06F 16/258 707/737 |
| 2014/0172754 A1* | 6/2014 | He | G06N 5/02 706/12 |
| 2014/0279583 A1* | 9/2014 | Surdeanu | G06Q 50/184 705/310 |
| 2014/0337345 A1* | 11/2014 | Motoyama | G06F 3/0604 707/738 |

(56) References Cited

U.S. PATENT DOCUMENTS

| | | | |
|---|---|---|---|
| 2014/0339374 A1* | 11/2014 | Mian | G08G 1/0175 246/473.1 |
| 2014/0344102 A1* | 11/2014 | Cooper | G06Q 30/0631 705/26.7 |
| 2014/0351258 A1* | 11/2014 | Dayan | G06F 17/30705 707/740 |
| 2014/0372443 A1* | 12/2014 | Delaney | G06F 21/6218 707/737 |
| 2014/0372453 A1* | 12/2014 | Rajaram | G06F 17/3053 707/749 |
| 2015/0023549 A1* | 1/2015 | Krauss | G06K 9/4647 382/103 |
| 2015/0039611 A1* | 2/2015 | Deshpande | G06F 16/285 707/737 |
| 2015/0095333 A1* | 4/2015 | Porpora | G06Q 50/26 707/737 |
| 2015/0120738 A1* | 4/2015 | Srinivasan | G06F 17/30598 707/739 |
| 2015/0154263 A1* | 6/2015 | Boddhu | G06F 16/285 707/737 |
| 2015/0161451 A1* | 6/2015 | Nye | G06K 9/00771 382/103 |
| 2015/0220588 A1* | 8/2015 | Krauss | G06F 16/245 707/692 |
| 2015/0220735 A1* | 8/2015 | Paithane | G06F 21/566 726/23 |
| 2015/0227591 A1* | 8/2015 | Jose | G06F 17/30598 707/777 |
| 2015/0286723 A1* | 10/2015 | Sun | G06F 17/278 707/706 |
| 2015/0286857 A1* | 10/2015 | Kim | G06F 17/30247 382/118 |
| 2015/0350180 A1* | 12/2015 | Faith | H04L 63/0807 726/9 |
| 2016/0063357 A1* | 3/2016 | Gao | G06K 9/4604 382/159 |
| 2016/0155063 A1* | 6/2016 | Rich | G06N 99/005 706/12 |
| 2016/0195608 A1* | 7/2016 | Ruenz | G01S 7/411 342/89 |
| 2016/0196331 A1* | 7/2016 | Jonas | G06F 16/245 707/603 |
| 2016/0210317 A1* | 7/2016 | Krauss | G06N 5/00 |
| 2016/0335478 A1* | 11/2016 | Bredno | G06K 9/00147 |
| 2016/0366546 A1* | 12/2016 | Yamasaki | H04W 4/02 |
| 2017/0103281 A1* | 4/2017 | Amtrup | G06K 9/00469 |
| 2017/0249650 A1* | 8/2017 | Olsen | G06Q 30/0202 |

OTHER PUBLICATIONS

Stauffer, C., "Minimally-Supervised Classification Using Multiple Observation Sets", In Proceedings of the Ninth IEEE International Conference on Computer Vision (ICCV'03), 8 pages, 2003.*

Parekh et al., "A Survey on Object Detection and Tracking Methods", International Journal of Innovative Research in Computer and Communication Engineering, vol. 2, Issue 2, Feb. 2014, pp. 2970-2978. (Year: 2014).*

Laykin et al.; "On-line feature and classifier selection for agricultural produce"; Proceedings of the Eighth IASTED International Conference on Artificial Intelligence and Soft Computing; 2004; Publisher: Acta Press; Country of Publication: USA; ISBN: 0889864586; 5 pp.

Laykin et al.; "On-line feature and classifier selection for agricultural produce"; Proceedings of the Eighth IASTED International Conference on Artificial Intelligence and Soft Computing; 2004; Publisher: Acta Press; Country of Publication: USA; ISBN: 0889864586.

* cited by examiner

Observation #1
    Features:
        Kingdom: Plant
        Species: sequoia sempervirens
        Geohash: 9q95r5zs Observation #2
    Features:
        Kingdom: Plant
        Species: Mimulus rattani
        Geohash: 9q95r5zs
        Lifespan: 1 year

Resolve based on kingdom and geohash =>

Observations #1 and #2 reflect an identical entity

Lifespan: 1 year is stored as a feature of the resolved composite entity

Observation #n
    Features:
        Kingdom: Plant
        Species: sequoia sempervirens
        Geohash: 9q95r5zs
        Age: 137 years Age is inconsistent with previously observed lifespan feature of 1 year

FIG. 3

CLASSIFYING ENTITIES BY BEHAVIOR

BACKGROUND

The present invention relates to data analysis, and more specifically, to entity analytics. Entity classification is a key function of many systems and products used for entity resolution and entity relationship recognition. Current entity resolution engine products are typically configured to classify entities according to simple input factors (e.g. an "entity class" code can be required as part of each inbound observation to be handled by the product). These products also can process information about each entity's components; such pieces of information are often known as "features" of those entities. Features are typically classified based on configured "feature class" codes.

However, this way of statically defining entity and feature classes has a few drawbacks. First, the product can be configured for use only on data that arrives from a specific set of sources and that is structured in certain ways. Second, product configuration is complex and requires every entity and feature class that may be anticipated for a given deployment to be defined in advance by specialists trained extensively to configure the product. Third, for a given configuration it is not possible to reclassify entities after the resolution phase, which may limit the resolution engine's ability to provide sensible resolutions. Thus, there is a need for improved entity classification and entity resolution techniques.

SUMMARY

According to one embodiment of the present invention, techniques for classifying entities are described. Data representing an observation of an entity is received. One or more features of the entity are identified. A first classification for the entity is assigned based on the identified features, and based on a best fit analysis of the identified features to existing classifications. In response to identifying one or more additional features of the entity and determining that the identified additional features meet an update criterion, or in response to determining that the identified features meet an update criterion based on a modified best fit analysis, the assigned first classification for the entity is changed to a second classification for the entity.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

FIG. 3 shows an exemplary set of observations and rules, in accordance with one embodiment.

Like reference symbols in the various drawings indicate like elements.

DETAILED DESCRIPTION

Figure 1:
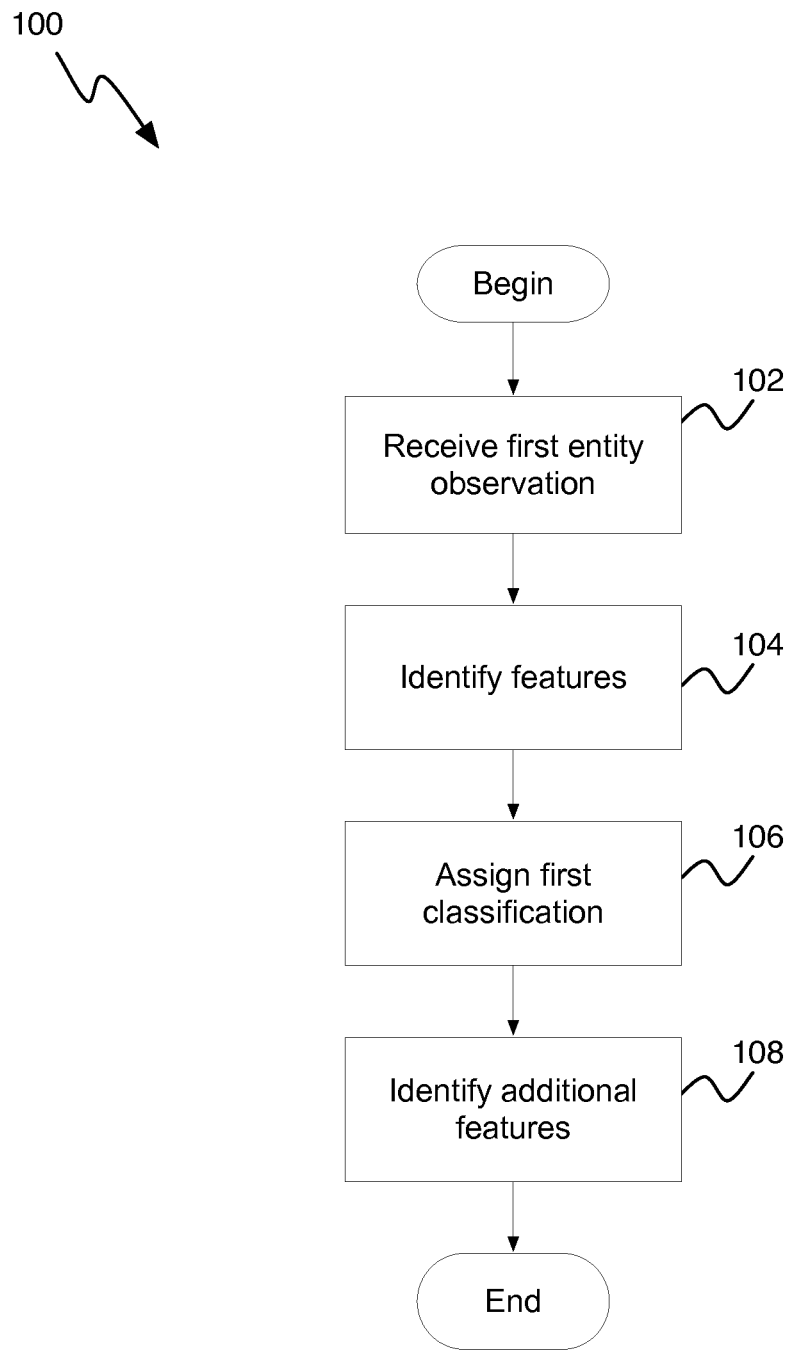
FIG. 1 shows a process (100) for classifying an entity, in accordance with one embodiment.

The various embodiments of the invention described herein pertain to dynamic entity and feature classification techniques that allow entity resolution engines to not only recognize previously undefined entity and feature classes, but also to associate inbound observations with those classes. Products incorporating the various embodiments described herein can benefit as will be described below, and can achieve more accurate entity resolution with fewer mix-ups in which either too many or too few entities resolve as can happen with conventional entity analytics products.

An enhancement that enables dynamic entity and feature classification and potential later reclassification, where the available data does not explicitly define entity and feature classes, is advantageous in several ways. First, it allows for the product to be used on unstructured or semi-structured data, coming from a wider variety of sources than currently feasible. That is, even data sources such as the Internet and various intranets, that provide information about entities of a variety of classes without necessarily defining those classes, can become available for entity resolution and entity relationship recognition. Second, product configuration is simplified, particularly if the product is able to distinguish entity and feature classes without those classes having been defined in advance. Also, an ability to reclassify entities after the resolution phase, potentially into more narrow entity classes, can enhance the resolution engine's ability to provide sensible resolutions.

In some embodiments, any inbound observation that lacks explicit entity or feature classification information can automatically be associated with an existing entity and/or feature class that "best fits" the observed aspects of the inbound data. A best fit analysis can include semantic analysis, natural language analysis, image analysis, motion detection analysis, pattern-matching analysis, behavior analysis, or any analysis suitable for assigning an entity or feature as recognized by the entity resolution engine to a class, such that the entity can be distinguishable from other entities. A best fit analysis also can include the application of a set of classification rules. The classification rules can be arranged so as to trigger one or more analyses when an entity is observed and to assign the entity to a class based on the outcome of the analyses. In one embodiment, some or all of the rules can be configured in advance by specialists trained to configure the resolution engine. In another embodiment, some or all of the rules can be programmatically deduced or synthesized via data analysis techniques, machine learning techniques, cognitive computing techniques, or other means. In any case, when the resolution engine has applied a best fit analysis to classify an entity or feature, it can track the fact that the classification is assumed rather than explicit. If it finds no best fit, it can programmatically associate the inbound observation with either an entirely new entity class, with one or more entirely new feature classes, or with both. Expressed differently, the resolution engine creates a new class that best fits the inbound data item.

Subsequently, at any time when entity resolution or relationships are being determined with respect to these assumed classes, the resolution engine can "question" any classification assumptions the resolution engine made earlier. As a result, if a different class is determined to be a better fit than the assumed class, at some point, then the entity and/or its features may be reclassified. Again, the resolution engine would do this programmatically. The term "programmatically" as used herein indicates the automated completion of a task, such as making an entity classification assumption and later re-evaluating that assumption and the corresponding entity classification, entirely without human guidance.

Questioning the assumptions for an entity and/or its features can involve re-evaluating classifications based on new information that has arrived since the observation. For example, with the arrival of new information about various types of entities that previously have been observed, new entity and feature classes that better fit the entities may be recognized based on the new information. Further, new information not only about an entity or feature, but also about the class of such an entity of feature, may be observed. When a new observation arrives regarding an entity for which classification assumptions have been applied, that new observation may include new information about the entity. In some cases, the new information may include an explicitly-defined entity or feature class. In other cases, the new information may include other details relevant to how the entity or its features may be classified.

Questioning the assumptions can lead to un-resolving and/or re-resolving entities whose resolutions are either nonsensical, overly optimistic, or overly pessimistic. If reclassifying an observed entity that the resolution engine has improperly failed to resolve would allow the entity to resolve with other observed entities that have matching features, then the entity can be reclassified so as to enable the proper resolution. Alternatively, if reclassifying entities that have been overzealously resolved, that is, into large amalgams incorporating an unreasonable quantity or range of entities, would trigger such amalgams to un-resolve, and potentially re-resolve more reasonably, then those entities can be reclassified so as to enable the needed un-resolutions and/or re-resolutions. The same logic can apply to entity features.

In some embodiments, entity classification rules are defined programmatically based on observations or resolutions of one or more entities. In one embodiment, this can happen when re-resolutions are needed. Detection of this condition can be as simple as observing a new feature of an entity that would otherwise have been resolved to be identical with a previously resolved entity, but for the fact that the feature is inconsistent with some other feature of the previously resolved entity. For example, FIG. 3 shows an exemplary scenario in which observations of entities of a given kingdom of living organisms, such as plants, are resolved to be identical when they inhabit an identical region identified by a geohash. If one observation (Observation #2) includes a life span feature whose value is 1 yr, and a later observation (Observation #3) includes an age feature that is greater than that life span, then (assuming a rule exists to compare life spans with ages) the observations can be un-resolved and re-resolved, possibly with one or more new entity classification rules synthesized to aid the re-resolution. For example, the un-resolved entity may include features not considered in the original resolution, such as an observed plant species feature. The newly synthesized rule can be based on an analysis of the observations thus far. If entities whose species feature value is "*Mimulus rattani*" (Observation #2) have consistently been associated with relatively small age and lifespan feature values, compared with entities whose species feature value is "*Sequoia sempervirens*" (Observation #3), then the new rule can classify entities as being distinct from *Sequoia sempervirens* entities. The resolution engine can thus apply the invention to do a more reasonable job resolving entities whose life span, or other behavior, can differentiate entities of different classes not originally contemplated by the individuals who deployed the resolution engine.

Turning now to FIG. 1, a process (100) is shown for classifying an entity based on an assumption, in accordance with one embodiment. As can be seen in FIG. 1, the process (100) starts by receiving a first observation of an entity (step 102). It then identifies one or more anticipated features of the received entity (step 104) and assigns a first classification based on the identified features and a "best fit" analysis between the identified features and existing classifications (step 106). The anticipated features are those known or previously assumed to be associated with an entity of the first classification. As will be described by way of the examples below, the best fit analysis can include applying rules to determine whether the features comport with entities of a particular class. The rules can be applied in a cascading manner to first classify the entity generally and to then classify the entity more specifically. The entity and its assumed classification are tracked for entity resolution or entity relationship determination purposes (step 108) and the process ends.

Figure 2:
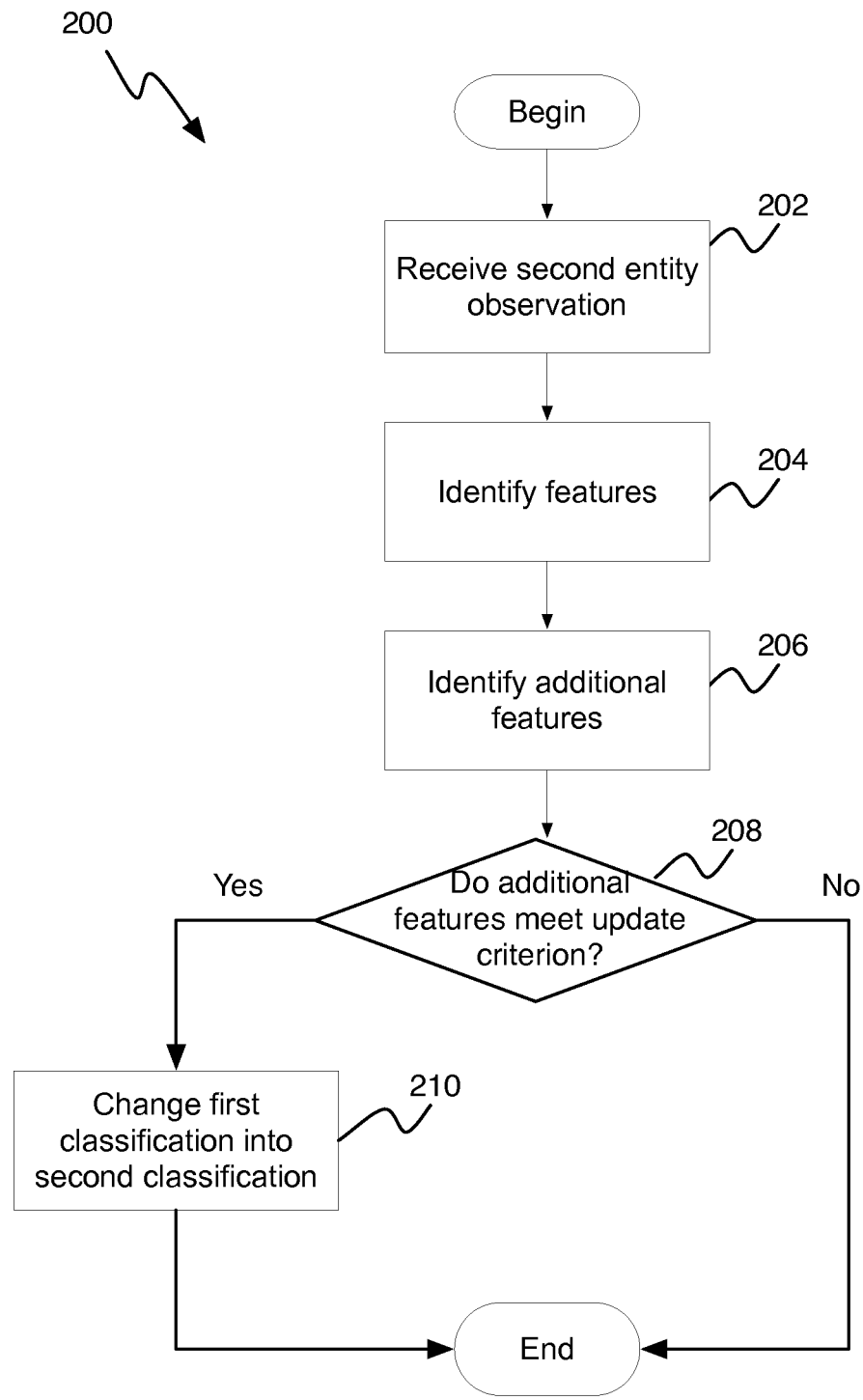
FIG. 2 shows a process (200) for reclassifying an entity based on questioning an assumption, in accordance with one embodiment.

Turning now to FIG. 2, a process (200) is shown for reclassifying an entity based on questioning an assumption, in accordance with one embodiment. As can be seen in FIG. 2, the process (200) starts by receiving a second observation of an entity (step 202) whose first classification has been assumed. It then identifies one or more anticipated features of the received entity (step 204) and one or more additional features based on the observation and based on the fact that the entity's classification is assumed (step 206). The additional features include any features the resolution engine can discern in the inbound data associated with the observed entity, that it has not known or previously assumed to be relevant to classification and/or resolution of entities of the assumed class. The process then determines whether these additional features meet an update criterion (step 208). The update criterion can include application of rules that can invalidate the assumption on which the first classification was based. The update criterion also can include application of other rules or classification factors, including but not limited to the introspective observation that resolutions have thus far proved to be either nonsensical, overly optimistic, or overly pessimistic. If the additional features do not meet the update criterion, the entity maintains its first classification and the process ends. However, if it is determined in step 208 that the additional features do meet the update criterion, then the first classification is changed into a second classification (step 210) and the process ends.

Figure 4:
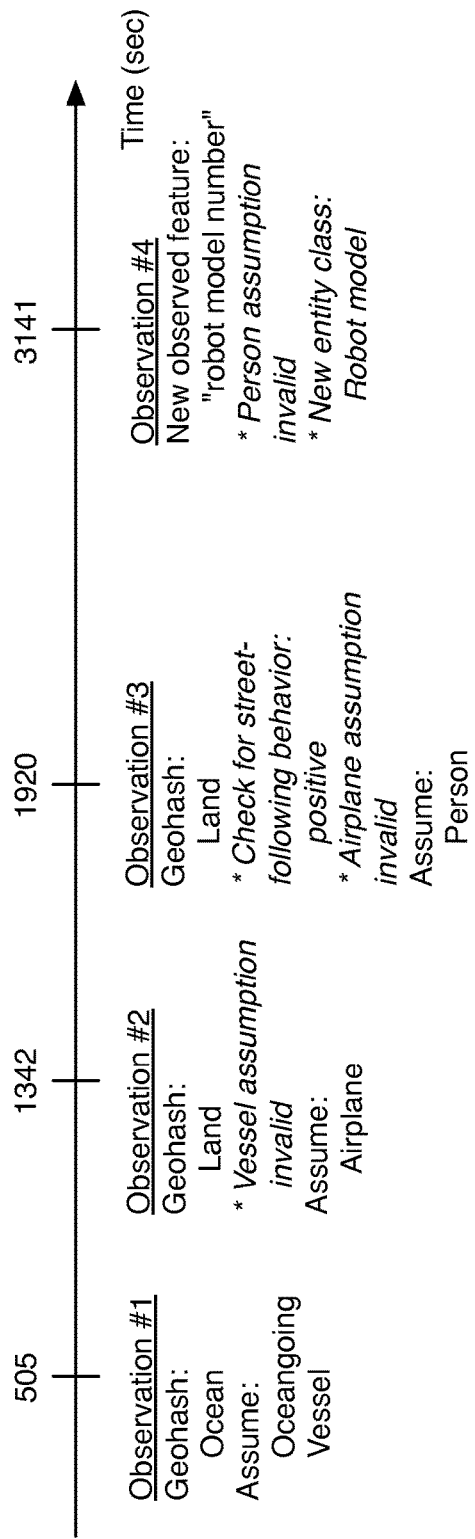
FIG. 4 shows an exemplary set of observations and rules, in accordance with one embodiment.

As was discussed above, the various embodiments of the invention allow for entities and features to be classified by their behaviors or other factors. To make this possible, cascading classification rules can be defined. These rules can be user-definable and/or specific to a particular application. In some embodiments, at least some of the rules can be programmatically synthesized based on various forms of analysis, natural language processing, machine learning, cognitive computing, or other methods applied to inbound data. In some embodiments, the rules might be relatively simple (e.g., "if an entity has a color, classify it as a physical entity," "if a physical entity has an address, further classify it as a person or building," "if a person or building has a two-word name, classify it specifically as a person," "if that 'person' is subsequently observed to have a number of floors, reclassify it as a building", etc.). In other embodiments, the rules might be more sophisticated (e.g., "if an entity has latitude and longitude coordinates, check whether the entity is over the ocean," "if so, assume it is an oceangoing vessel," "if it is later observed over land, reclassify it as an airplane," "if it is yet later observed to follow a path corresponding to a city street, reclassify the entity again, e.g. as a person, not an airplane," etc.). The resolution engine can recognize that entities are following a path using, for example, the techniques disclosed in U.S. patent application Ser. No. 13/798,314, or through any other suitable method. If the entity is later observed having a feature that is not compatible with personhood, or indeed with any entity class thus far known to the resolution engine, then in one embodiment a class can be programmatically added to the set of known classes. For instance, if an entity thus far classified as a person were to be observed having a feature designated "robot model number", and robot models were not among the set of recognized entity classes, then a robot model can be added to the set, and the entity can be reclassified accordingly. One such scenario is schematically illustrated in FIG. 4, which contains a number of entity classes (i.e., Oceangoing vessel, Land motor vehicle, Airplane and Person), and a set of rules for classifying the entities. As observations arrive, the assumed entity classes change, in the illustrated case from Oceangoing vessel (Observation #1), to Airplane (Observation #2), to Person (Observation #3), and finally to the new entity class "Robot model" (Observation #4).

Suppose, as in the above example, that observations of an entity include positional coordinates such as latitudes and longitudes. The resolution engine can recognize this entity as it is observed over time, if a name, serial number, or other identifying information is always included with its observed coordinates. Suppose also that the entity is first observed with coordinates that place the entity in or over the ocean. To recognize this, the resolution engine must additionally be provided with a way to differentiate land from ocean. This could be defined, say, by associating the most significant sixteen bits of every possible geohash value with a land qualifier versus an ocean qualifier, for example, in the form of a single bit per geohash value. Alternatively, it could be defined as a set of bit vectors or other data structures representing geohashes, or latitudes and longitudes, describing land/ocean boundaries, or via a lookup in a chart, table, or map that indicates whether or not a given geohash, or latitude/longitude pair corresponds to land. Then, when the entity moves from ocean to land, the resolution engine can recognize this change and reclassify the entity from an oceangoing vessel class to an airplane class, for example.

Reclassification can occur during several conditions including (but not limited to): (a) when an entity is in the process of attempted resolution with other entities, or (b) as a post-resolution step in which assumptions are questioned regarding a resolved entity based on a new observation, or (c) if classification or resolution rules are modified. Various embodiments can include one or more of these approaches. Similarly, entity relationships can be determined based on assumed classifications and can be revisited based on logic that works much like the above.

As the skilled person realizes, occasionally there might be situations in which entities with a set of original identified features have been misclassified based on those features, not involving any additional features that might have enabled a more reasonable classification. For example, the resolution engine may have seen fit to recognize a "qwerty keyboard" feature as a reason to assign entities having that feature to a "typewriter" class. Reclassification of some of those entities (based, say, on additional features of just those entities) might reveal that assumption to be wrong for most entities. This could be revealed, for example, through an introspective analysis by the resolution engine, e.g. the resolution engine could perform statistics on reclassification rates to determine that an assumed classification was invalid for all entities of the class. In such a situation, most or all of the remaining entities that have been classified as "typewriter" entities because of their "qwerty keyboard" features might be reclassified using the techniques described above, but without the need to identify additional features.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for classifying physical entities in an entity resolution engine, comprising:
   receiving, by a computer, data representing an observation of a physical entity, wherein the data includes a representation of geographic coordinates for the physical entity;
   identifying, by the computer, one or more features of the physical entity based on the data representing the observation of the physical entity;
   assigning, by the computer, a first classification for the physical entity based on the identified one or more features and a best fit analysis of the identified one or more features to existing classifications, wherein the best fit analysis includes one or more of: semantic analysis, natural language analysis, image analysis, motion detection analysis, pattern-matching analysis, behavior analysis; and
   in response to identifying, by the computer, one or more additional features of the physical entity based on data representing an additional observation of the physical entity and determining, by the computer, that the identified one or more additional features meet an update criterion invalidating assumptions on which the first classification was assigned, or in response to determining, by the computer, that the identified one or more additional features meet an update criterion based on a modified best fit analysis,
   defining and adding a second classification to the existing classifications, and
   changing, by the computer, the assigned first classification for the physical entity to the second classification for the physical entity.

2. The method of claim 1, wherein the first classification is selected from a set of defined classifications.

3. The method of claim 1, wherein the evidence that the assumption is incorrect includes further observations of one or more physical entities.

4. The method of claim 1, wherein the first classification and the second classification are based on rules and information selected from a group consisting of: data, location, movement, speed, and behavior patterns pertinent to the observed physical entity.

5. The method of claim 4, wherein the rules are defined programmatically based on observations or resolutions of one or more physical entities.

6. The method of claim 4, wherein the rules are defined by user input.

7. A computer program product for classifying physical entities in an entity resolution engine, the computer program product comprising a non-transitory computer readable storage medium having program instructions embodied therewith, the program instructions being executable by a processor to cause the processor to perform a method comprising:
   receiving, by the processor, data representing an observation of a physical entity, wherein the data includes a representation of geographic coordinates for the physical entity;

identifying, by the processor, one or more features of the physical entity based on the data representing the observation of the physical entity;

assigning, by the processor, a first classification for the physical entity based on the identified one or more features and a best fit analysis of the identified one or more features to existing classifications, wherein the best fit analysis includes one or more of: semantic analysis, natural language analysis, image analysis, motion detection analysis, pattern-matching analysis, behavior analysis; and in response to identifying, by the processor, one or more additional features of the physical entity based on data representing an additional observation of the physical entity and determining, by the processor, that the identified one or more additional features meet an update criterion invalidating assumptions on which the first classification was assigned, or in response to determining, by the processor, that the identified one or more additional features meet an update criterion based on a modified best fit analysis, defining and adding a second classification to the existing classifications, and changing, by the processor, the assigned first classification for the physical entity to the second classification for the physical entity.

8. The computer program product of claim 7, wherein the first classification is selected from a set of defined classifications.

9. The computer program product of claim 7, wherein the evidence that the assumption is incorrect includes further observations of one or more physical entities.

10. The computer program product of claim 7, wherein the first classification and the second classification are based on rules and information selected from a group consisting of: data, location, movement, speed, and behavior patterns pertinent to the observed physical entity.

11. The computer program product of claim 10, wherein the rules are defined programmatically based on observations or resolutions of one or more physical entities.

12. The computer program product of claim 10, wherein the rules are defined by user input.

13. An entity resolution engine, comprising:

a processor; and a memory storing instructions executable by the processor to perform a method comprising:

receiving, by the processor, data representing an observation of a physical entity, wherein the data includes a representation of geographic coordinates for the physical entity;

identifying, by the processor, one or more features of the physical entity based on the data representing the observation of the physical entity;

assigning, by the processor, a first classification for the physical entity based on the identified one or more features and a best fit analysis of the identified one or more features to existing classifications, wherein the best fit analysis includes one or more of: semantic analysis, natural language analysis, image analysis, motion detection analysis, pattern-matching analysis, behavior analysis; and in response to identifying, by the processor, one or more additional features of the physical entity based on data representing an additional observation of the physical entity and determining, by the processor, that the identified one or more additional features meet an update criterion invalidating assumptions on which the first classification was assigned, or in response to determining, by the processor, that the identified one or more additional features meet an update criterion based on a modified best fit analysis, defining and adding a second classification to the existing classifications, and changing, by the processor, the assigned first classification for the physical entity to the second classification for the physical entity.

* * * * *